US012594694B2

(12) United States Patent
Guinaldo Fernández et al.

(10) Patent No.: US 12,594,694 B2
(45) Date of Patent: Apr. 7, 2026

(54) METHODS FOR RECYCLING PLASTIC NYLON 6,6 FROM VACUUM BAGS TO OBTAIN FILAMENTS OR POWDER FOR 3D PRINTING PROCESSES

(71) Applicant: Airbus Operations S.L.U., Getafe (ES)

(72) Inventors: Enrique Guinaldo Fernández, Getafe (ES); Tamara Blanco Varela, Getafe (ES); Guillermo Hernáiz López, Getafe (ES); José Sánchez Gómez, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 1146 days.

(21) Appl. No.: 17/601,249

(22) PCT Filed: Apr. 6, 2020

(86) PCT No.: PCT/ES2020/070229
§ 371 (c)(1),
(2) Date: Oct. 4, 2021

(87) PCT Pub. No.: WO2020/201609
PCT Pub. Date: Oct. 8, 2020

(65) Prior Publication Data
US 2022/0184857 A1 Jun. 16, 2022

(30) Foreign Application Priority Data
Apr. 5, 2019 (EP) ..................................... 19382254

(51) Int. Cl.
B29B 17/04 (2006.01)
B29B 9/14 (2006.01)
(Continued)

(52) U.S. Cl.
CPC ............ *B29B 17/0412* (2013.01); *B29B 9/14* (2013.01); *B29B 9/16* (2013.01); *B33Y 40/00* (2014.12);
(Continued)

(58) Field of Classification Search
CPC ......... B29B 17/0021; B29B 9/14; B29B 9/16; B29B 9/04; B29B 2017/0021;
(Continued)

(56) References Cited

U.S. PATENT DOCUMENTS 5,129,813 A * 7/1992 Shepherd ............ B32B 37/1018
156/286
6,187,917 B1 2/2001 Mayer et al.
(Continued)

FOREIGN PATENT DOCUMENTS

EP 3012078 A1 4/2016
JP 3303610 B2 7/2002

OTHER PUBLICATIONS

Francis, R. Recycling of Polymers—Methods, Characterization and Applications. John Wiley & Sons. 2017. Chapter 3: Methods of Recycling. pp. 55-114 (Year: 2017).*
(Continued)

*Primary Examiner* — Christina H.W. Rosebach
(74) *Attorney, Agent, or Firm* — Greer Burns & Crain Ltd.

(57) ABSTRACT

Methods for recycling plastic Nylon 6,6 from vacuum bags to obtain filaments or powder for 3D printing processes. The method to obtain filaments includes a step of providing used Nylon 6,6 vacuum bags, a quality control step to check the status of the used vacuum bags, a step to form smaller parts, such as smaller pieces or pellets, from the used vacuum bags, quality control step to check the status of the smaller pieces or the pellets, an extrusion step wherein the smaller
(Continued)

pieces or the pellets are introduced into an extruder, where they are melted, and the molten mixture is cooled and expelled through the die of the extruder to produce the recycled filaments, and a winding step wherein the recycled filaments that go out of the extruder are rolled up in coils.

12 Claims, 8 Drawing Sheets

(51) Int. Cl.

| | |
|---|---|
| *B29B 9/16* | (2006.01) |
| *B33Y 40/00* | (2020.01) |
| *B33Y 70/00* | (2020.01) |
| *B29B 17/00* | (2006.01) |
| *B29K 105/12* | (2006.01) |
| *C08J 11/06* | (2006.01) |

(52) U.S. Cl.
CPC ....... *B33Y 70/00* (2014.12); *B29B 2017/0021* (2013.01); *B29B 2017/042* (2013.01); *B29B 2017/0468* (2013.01); *B29B 2017/0496* (2013.01); *B29K 2105/12* (2013.01); *C08J 11/06* (2013.01); *Y02W 30/52* (2015.05); *Y02W 30/62* (2015.05)

(58) Field of Classification Search
CPC ...... B29B 2017/042; B29B 2017/0468; B29B 2017/0496; B29B 17/0412; B33Y 40/10; B33Y 70/00; B33Y 40/00; B29K 105/12
See application file for complete search history.

(56) References Cited

U.S. PATENT DOCUMENTS

| | | | | |
|---|---|---|---|---|
| 8,366,977 | B2 | 2/2013 | Weiser et al. | |
| 2004/0053047 | A1 | 3/2004 | Jackson et al. | |
| 2004/0186190 | A1 | 9/2004 | Mckinnon | |
| 2004/0249001 | A1 | 12/2004 | Leboeuf | |
| 2006/0001187 | A1* | 1/2006 | Allen, III | B29B 17/02 |
| | | | | 264/911 |
| 2016/0107337 | A1* | 4/2016 | Acerbo | B33Y 70/00 |
| | | | | 264/143 |
| 2017/0292020 | A1* | 10/2017 | Basire | C08K 11/005 |

OTHER PUBLICATIONS

International Search Report; priority document.

\* cited by examiner

FIG. 1B (∗) CUT INTO SMALL PIECES AND ROLLED INTO FILMS (∗∗) OBTENTION OF PELLETS IN SET OF EXTRUDER AND CUTTER (*) SET OF EXTRUDER AND CUTTER (*)     CUT INTO SMALL PIECES AND ROLLED INTO FILMS ()     OBTENTION OF PELLETS IN SET OF EXTRUDER AND CUTTER (*)     SET OF EXTRUDER AND CUTTER

METHODS FOR RECYCLING PLASTIC NYLON 6,6 FROM VACUUM BAGS TO OBTAIN FILAMENTS OR POWDER FOR 3D PRINTING PROCESSES

CROSS-REFERENCES TO RELATED APPLICATIONS

This application claims the benefit of the International Application No. PCT/ES2020/070229, filed on Apr. 6, 2020, and of the European patent application No. 19382254.1 filed on Apr. 5, 2019, the entire disclosures of which are incorporated herein by way of reference.

FIELD OF THE INVENTION

The invention refers to methods for recycling plastic Nylon 6,6 from vacuum bags to obtain filaments or powder for 3D printing of plastics, for instance by using Fused Filament Fabrication (FFF) printers and/or Selective Laser Sintering (SLS) printers.

3D printed aeronautical flying or non-flying parts can be produced with these recycled filaments or powder. As examples of non-flying parts, tools or other manufacturing elements can be included.

BACKGROUND OF THE INVENTION

Nowadays, raw plastics which are a base of the Fused Filament Fabrication (FFF) filaments or the powder for Selective Laser Sintering (SLS) processes are obtained from virgin materials. The same situation is observed for the fiber reinforcements: they are obtained from the classical manufacturing methods known for the raw fibers.

Currently, there is not any process or procedure for the recycling of vacuum bags which are extensively used for curing processes of prepreg materials and/or vacuum based infusion processes such as LRI, VARTM, RFI, etc.

Nevertheless, there are some methods and processes for the recycling of polyamides. As Nylon 6,6, the material that vacuum bags are made of, is part of the polyamides family, this opens the possibility of finding a second life for this material that is extensively used in the composites industry and can be re-used in other applications.

So far, current methods for recycling polyamides carry out processes of depolymerization and repolymerization, as disclosed in the following patent documents:

U.S. Pat. No. 8,366,977 B2: Process of making recycled polyamide yarn.

US 2004/0249001 A1: Process for the solution recovery of nylon with high reactivity and articles made therefrom.

U.S. Pat. No. 6,187,917 B1: Process for the purification of caprolactam obtained from the depolymerization of polyamide-containing carpet.

US 2004/0186190 A1: Solvent-based recovery and recycle polyamide material.

Regarding recycled reinforcement fibers, currently there are developed processes for obtaining fibers from carbon fiber reinforced processes like the pyrolysis or the solvolysis. These activities are acquiring more importance due to the interest of several industries, like the automotive one.

However, so far these reinforcements are not used to reinforce Additive Manufacturing filaments, they are mostly used for non-highly loaded components manufactured by short fiber reinforcement molding.

Currently, Nylon 6,6 is used without being combined and with short-fiber reinforcement for parts with no structural requirements in aircraft manufactured by classical methods, for example, machining a round bar. In addition, it is used in the aeronautics industry for the design of prototypes and models, as well as for the fabrication of drill templates.

Nowadays, one of the main issues associated with the increase of composite parts in aircraft is the amount of material scrap/waste obtained in production plants, which highly affects part life cycle:

Auxiliary materials/vacuum bags: during part curing processes (Autoclave or OoA), a large number of vacuum bags are needed, which are thrown away once curing processes are performed.

Composite/fiber reinforced plastics (FRP) scrap: in addition, tons of CFRP scrap are obtained during part production, which are nowadays mostly buried.

In fact, this problem could be greater in the future with the expected environmental regulation changes, which may limit material waste. Therefore, solutions are needed as soon as possible to reduce and/or recycle the material waste obtained in composite part production.

On the other hand, 3D printing (also known as Additive Manufacturing) is a technology with high advantages for application in aeronautical or other fields, which is now being widely developed and explored to get the full potential of it. Particularly, plastics and reinforced plastics 3D printing are making their way in the market and showing also high potential for different applications (e.g., low loaded parts).

SUMMARY OF THE INVENTION

An object of the invention is to provide methods for recycling plastic Nylon 6,6 from vacuum bags (for example, those used in aircraft part production) to obtain filaments or powder for 3D printing processes, such that the scrap materials obtained in the production of composite parts can be reduced.

The invention provides a method for recycling plastic Nylon 6,6 from vacuum bags to obtain filaments for 3D printing processes, that comprises the following steps:

providing used Nylon 6,6 vacuum bags, quality control step to check the status of the used vacuum bags, step to form smaller parts from the used vacuum bags:

the vacuum bags are taken into a grinder machine where they are cut up in smaller pieces, or the vacuum bags are cut into films, the films are rolled up and then are introduced into a set of extruder and cutter to obtain pellets, quality control step to check the status of the pieces, extrusion step: the smaller pieces or the pellets are introduced into an extruder, where they are melted, and the molten mixture is cooled and expelled through the die of the extruder to produce the recycled filaments, and winding step: the recycled filaments that go out of the extruder are rolled up in coils.

The invention also provides a method for recycling plastic Nylon 6,6 from vacuum bags to obtain powder for 3D printing processes, that comprises the following steps:

providing used Nylon 6,6 vacuum bags, quality control step to check the status of the used vacuum bags, and grinding step: the vacuum bags are taken into a grinder machine where they are cut up in powder particles.

The invention presents several advantages, related to the recycling of a material, which is supposed to be used just once, for an innovative application/use (3D printing):

Positive Environmental Impact/Life Cycle Assessment:

Recycling Nylon 6,6 of the vacuum bag allows the bag to be reused for a completely different and innovative target from the previous one.

Reinforcements from fiber reinforced plastics can be reused by introducing them in the product life cycle again instead of burying them.

Make 3D printing processes more attractive from environmental point/life cycle assessment of view.

Positive Economic/Cost Impact:

Mitigate the costs of new plastics and reinforcements purchase, raw materials for the 3D printing processes/parts.

Mitigate the costs, both economical and of brand image, of waste production and treatment.

Potential sales of a recycled product to other industries (outside aerospace field).

Other characteristics and advantages of the present invention will be clear from the following detailed description of several embodiments illustrative of its object in relation to the attached figures.

BRIEF DESCRIPTION OF THE DRAWINGS

Figure 1B:
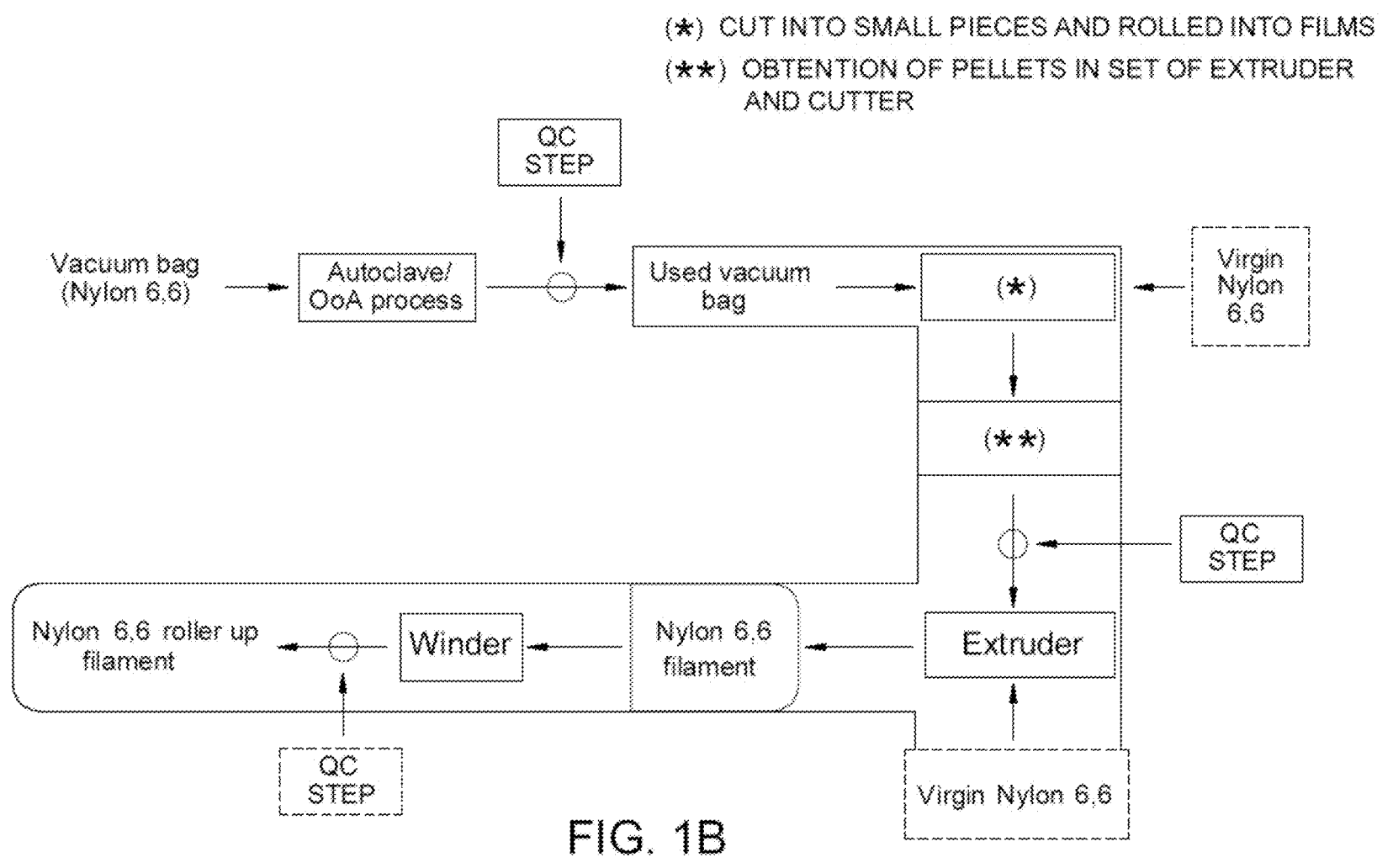

FIG. 1B shows a schematic diagram of the method for recycling plastic Nylon 6,6 from vacuum bags to obtain unreinforced filaments for 3D printing processes of the invention, in a second alternative.

DETAILED DESCRIPTION OF THE PREFERRED EMBODIMENTS

Figure 1A:
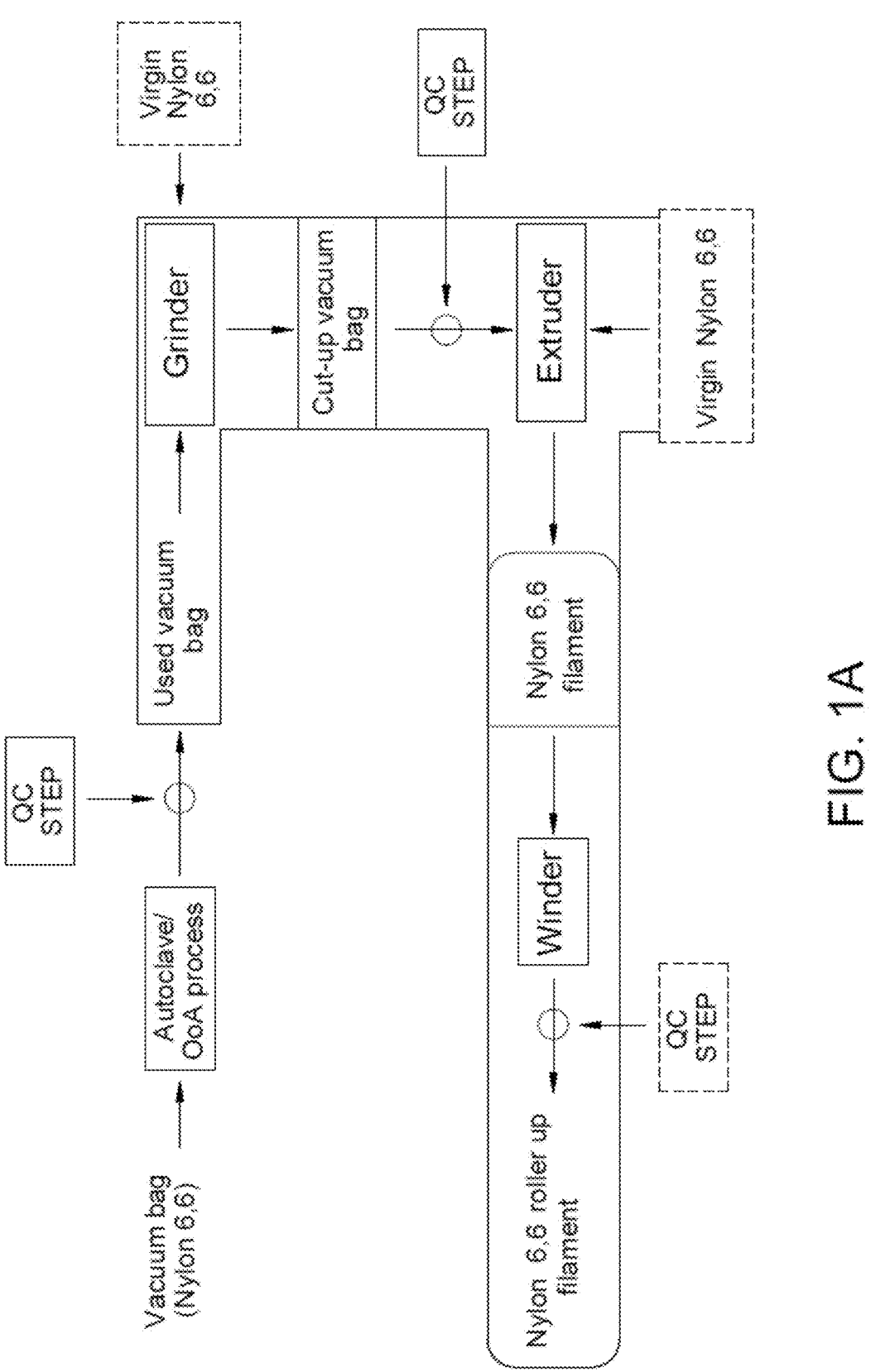
FIG. 1A shows a schematic diagram of the method for recycling plastic Nylon 6,6 from vacuum bags to obtain unreinforced filaments for 3D printing processes of the invention, in a first alternative.
Figure 2:
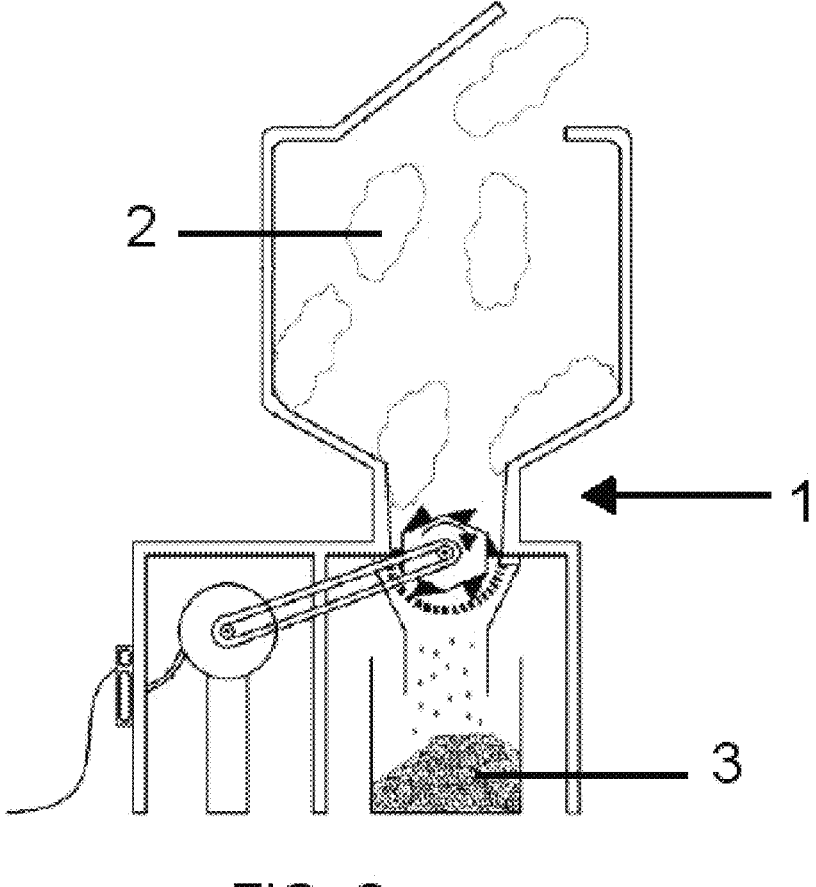
FIG. 2 shows a schematic representation of a grinder machine of FIG. 1A.
Figure 3:
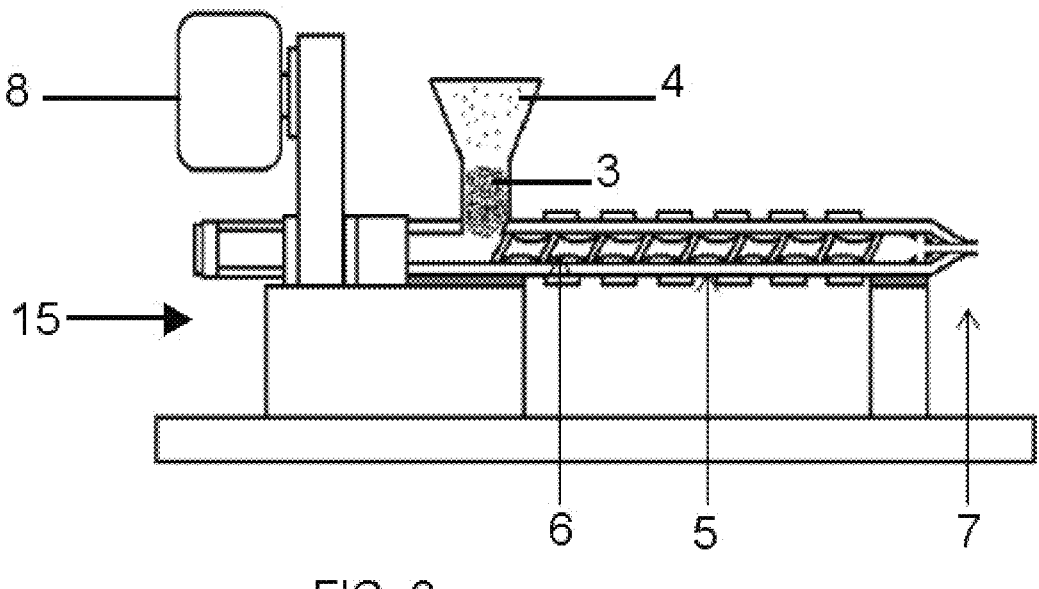
FIG. 3 shows a schematic representation of an extruder of FIG. 1A.

The invention refers to methods for recycling plastic Nylon 6,6 from vacuum bags 2 (for example, those used in aircraft part production) to obtain filaments 9 or powder for 3D printing processes, particularly for the production of aircraft parts.

The filaments 9 are used for Fused Filament Fabrication (FFF) and the powder for Selective Laser Sintering (SLS).

A) Filament Manufacturing.

Recycled filaments 9 may be obtained with or without reinforcement from production vacuum bags 2 and CFRP scraps.

The process/steps to be followed to recycle vacuum bag 2 (Nylon 6,6), including the 3D printing filament production, are described hereafter:

Providing used Nylon 6,6 vacuum bags 2.

Quality Control Step:

In order to control if vacuum bags 2 have suffered any kind of problem, a quality control step is needed. This control should be performed periodically, including visual inspection to detect any change of color, appearance, rigidity or flexibility that involves crystallinity degree modification, and/or concentration of resin residues, and thermal analysis, such as Thermogravimetry (TMA), to detect potential effect in different parameters, such as weight loss percentage.

Moreover, a quality control may be performed periodically at the end of the recycling process to check out if the final product (filament) has the specified/needed properties for the application.

Step to Form Smaller Parts from the Used Vacuum Bags:

Once vacuum bags 2 have been used for curing processes (Autoclave or OoA: Out-of-Autoclave), and after being analyzed (if needed), they are picked up and they can:

Be brought into a grinder 1 where they are cut up in smaller minute pieces 3 (for instance, 0.5×0.5 cm) that lead to a quicker melting due to their larger superficial area. Different piece sizes can be considered depending on the overall areal weight of the vacuum bag 2 material.

This process is almost immediate, thus, as the vacuum bags 2 go into the grinder 1, the small cut pieces 3 leave the grinder 1 in a non-stop process. Hence, the length of this step depends on the number of used vacuum bags 2 and in case of mixing, on the quantity of virgin Nylon 6,6 which follows the same procedure, or:

Be cut into films, then the films are rolled up and then are introduced into a set of extruder and cutter to obtain pellets.

As indicated, the process of adding virgin material is not mandatory, but helps to improve the quality of the re-used material.

Quality Control Step

A quality control of the smaller pieces 3 or the pellets is performed after the previous step. This quality control step comprises one or more of the following controls:

thermal analysis, such as Differential Scanning calorimetry (DSC), to detect changes in Glass Transition Temperature (Tg), melting temperature (Tm) or extent of crystallinity, and molecular weight analysis, such as Gel Permeation Chromatography (GPC).

Extrusion Step:

The smaller pieces 3 or the pellets are introduced in an extruder 15 with a motor 8 for the purpose of producing the filaments 9. To do so, the smaller pieces 3 or the pellets go through a hopper 4 and they are melted in the central part of the extruder 15 (Barrel 5 and Screw 6) at a temperature above the melting temperature of Nylon 6,6 ($\approx$273° C.). As indicated, cut virgin Nylon 6,6 can also be added (for example, in a 50:50 proportion, or in any other proportion) and melted together. Finally, the melt/molten mixture is expelled from the extruder 15 by the die 7, which shapes the melt/molten mixture in the planned filaments 9 (1.75-3 mm diameter) due to the drop of temperature. As for the first step, the length of this step depends on the number of used vacuum bags 2 that provide the small cut pieces 3 or the pellets and on the quantity of needed virgin Nylon 6,6 in case of mixing.

The outdoor temperature or a cooler facilitates the cooling and the solidification right after the die 7. Furthermore, the filaments 9 can also be dyed later.

In the first step, virgin Nylon 6,6 could also be added together with the vacuum bags 2 (for example, in a 50:50 proportion, or in any other proportion) to the same grinder 1 and then melted together.

Figure 5A:
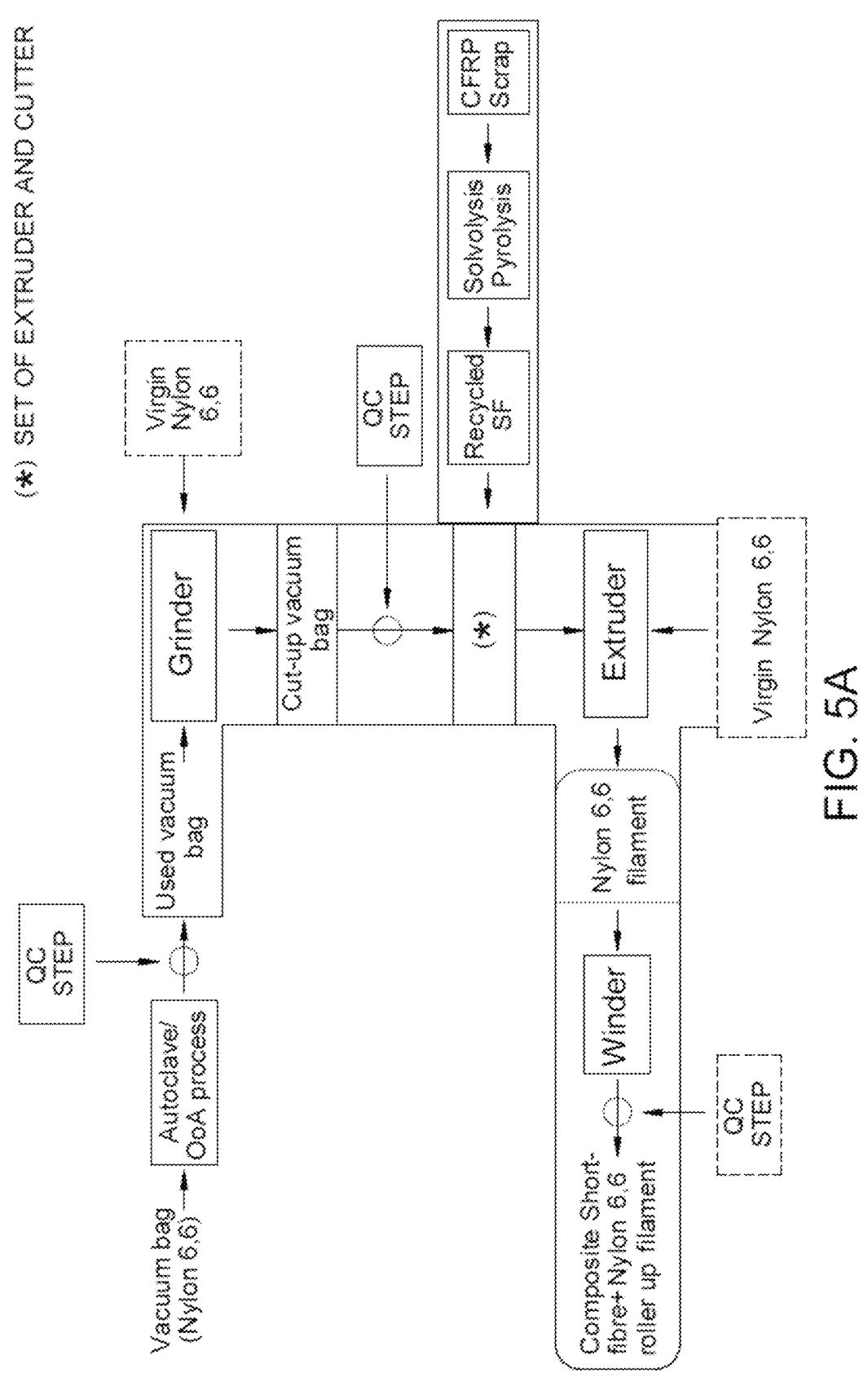
FIG. 5A shows a schematic diagram of the method for recycling plastic Nylon 6,6 from vacuum bags to obtain reinforced filaments for 3D printing processes of the invention, in a first alternative.
Figure 5B:
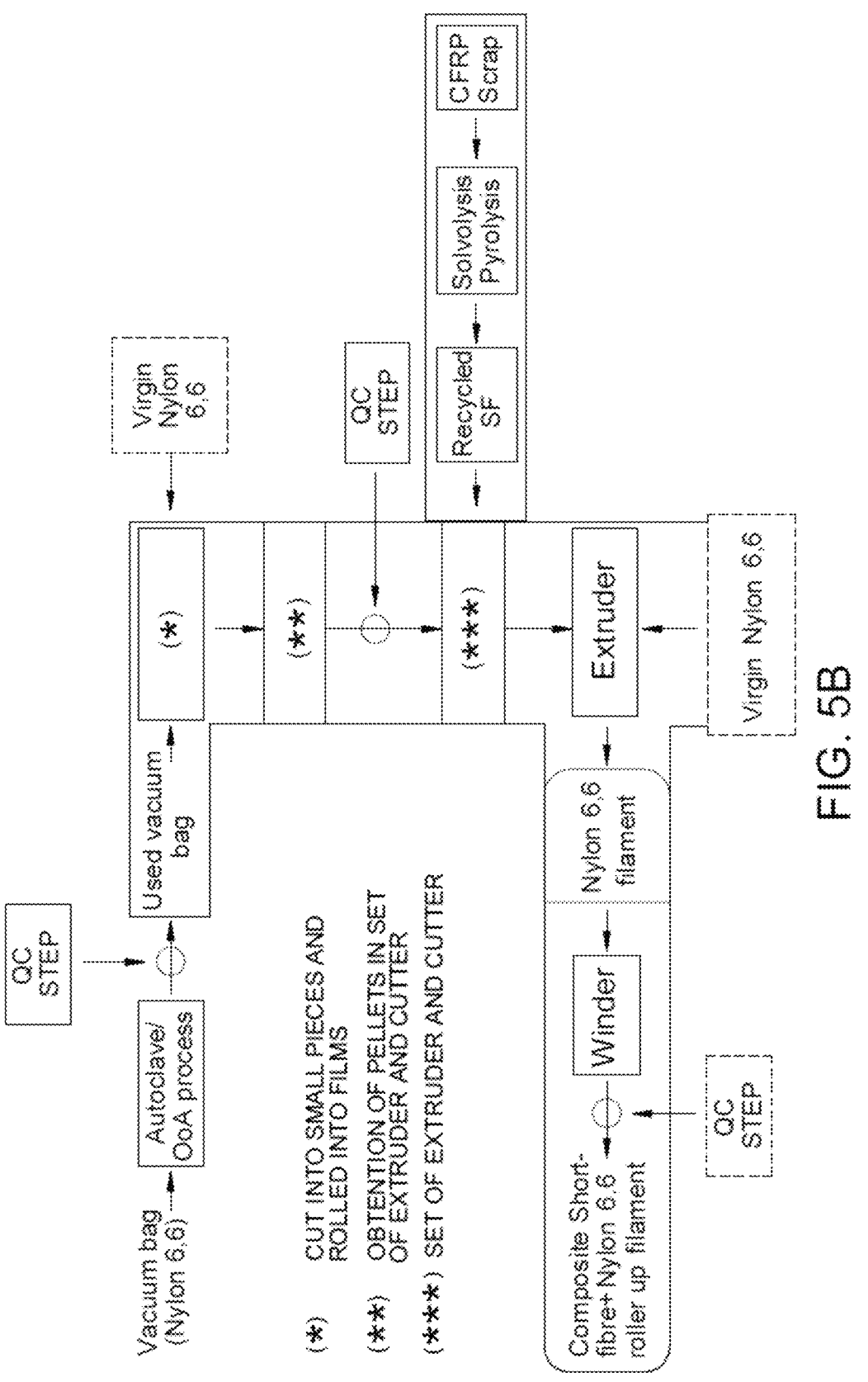
FIG. 5B shows a schematic diagram of the method for recycling plastic Nylon 6,6 from vacuum bags to obtain reinforced filaments for 3D printing processes of the invention, in a second alternative.

As mentioned, filaments 9 can be reinforced adding different fibers such as carbon, glass or aramid fibers or other reinforcements such as CNTs, Graphene, carbon black, nanoparticles, etc. Relevant for this proposal is the introduction of recycled fibers (for example, Recycled Short Fiber: Recycled SF in FIGS. 5A and 5B) coming from fiber reinforced plastics scrap obtained during aeronautical part production, through standard process of pyrolysis or solvolysis and applying also a grinding/cutting process to obtain cut fiber, that needs to be fed also to the extrusion process in combination with the plastic, Nylon 6,6, smaller pieces 3 or the pellets.

The reinforcement can be obtained in a compounding step before the extrusion step, in which the smaller pieces 3 or the pellets and fiber reinforcements are introduced in a set of extruder and cutter for the compounding step to obtain reinforced smaller pieces or reinforced pellets to be used in the extrusion step.

Tests conducted adding different fiber percentages in weight were carried out satisfactory, 30% and 40% trials are prepared.

Winding Step:

As the recycled Nylon 6,6 filaments 9 go out of the extruder 15 reinforced or unreinforced, they are rolled up in coils 10 by using a winding process. In order to be placed in the 3D printing device, each coil 10 has to have around 270 meters of filament 9 rolled up on itself.

Figure 4:
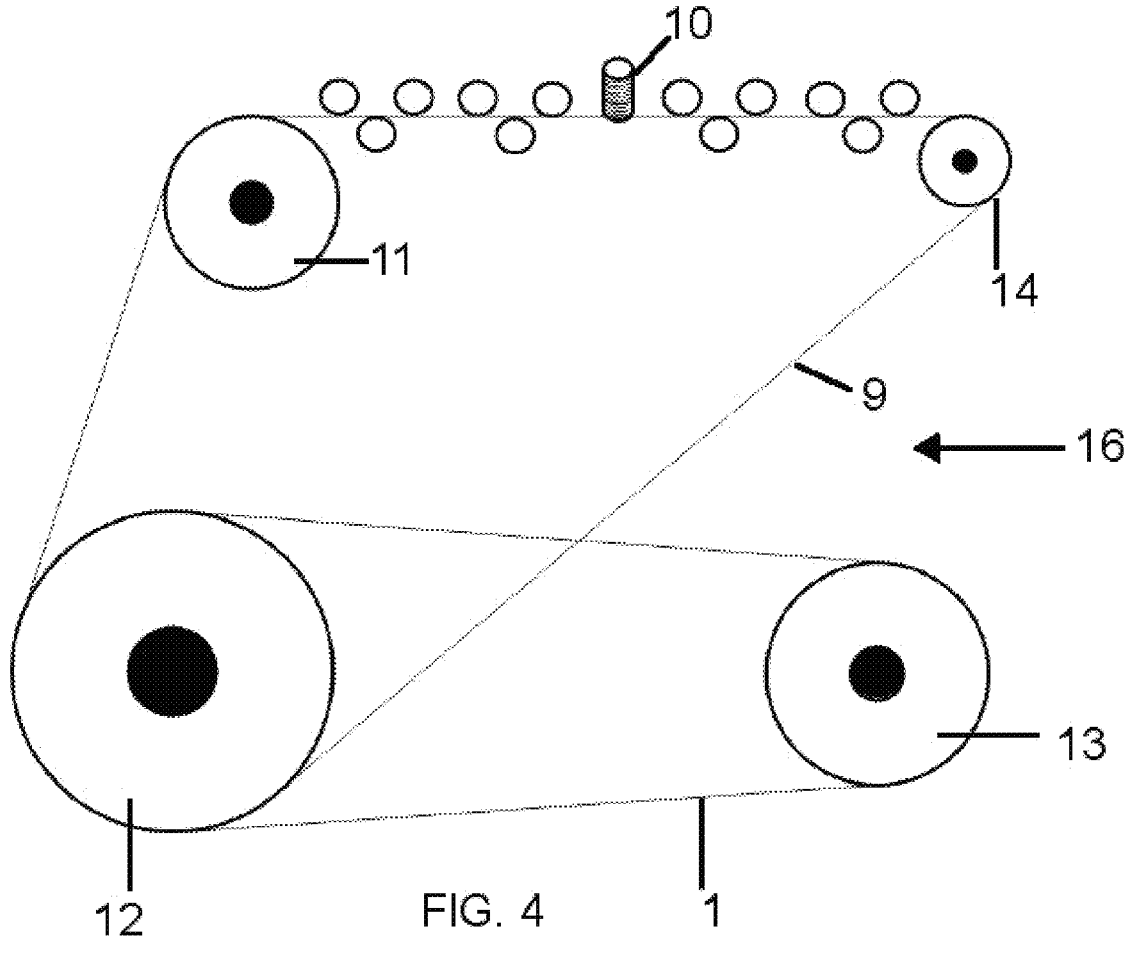
FIG. 4 shows a schematic representation of a winder of FIG. 1A or 1B and the winding process.

FIG. 4 shows a schematic representation of a winder 16 with an intermediate pulley 11, a pulley 12, a motor 13 and a tension bearing 14, and the winding process.

Figure 6:
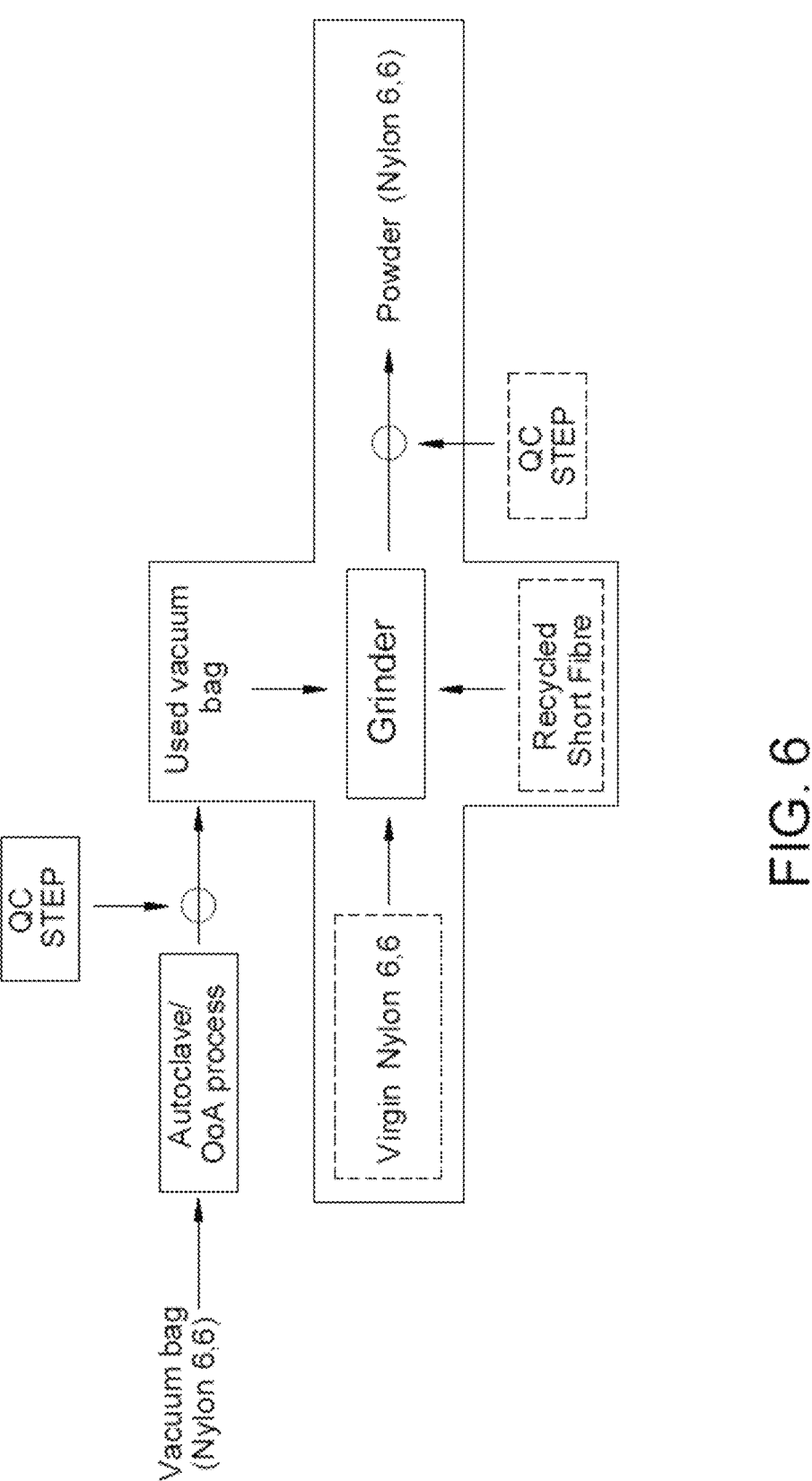
FIG. 6 shows a schematic diagram of the method for recycling plastic Nylon 6,6 from vacuum bags to obtain powder for 3D printing processes of the invention.

B) Powder Manufacturing (FIG. 6):

The following steps describe the process used to recycle the vacuum bag 2 material (Nylon 6,6) as 3D printing powder material:

Providing used Nylon 6,6 vacuum bags 2.

Quality Control Step:

In order to control if vacuum bags 2 have suffered any kind of problem, a quality control step is needed. This control should be performed periodically, including: visual inspection to detect any change of color, appearance, rigidity or flexibility that involves crystallinity degree modification, and/or concentration of resin residues, and thermal analysis, such as Thermogravimetry (TMA), to detect potential effect in different parameters, such as weight loss percentage.

Moreover, a quality control may be performed periodically at the end of the recycling process to check out if the final product (powder) has the specified properties.

Grinding Step:

After curing processes and being analyzed (if needed), vacuum bags 2 are brought into a grinder 1 that produces very little pieces (powder with particles of 0.1 mm diameter) by cutting them up.

Used vacuum bags 2 could also be mixed (in a 50:50 proportion, or in any other proportion) with virgin Nylon 6,6 to improve the quality of the used material, providing as well, powder particles with 0.1 mm diameter.

Additionally, during this step recycled Nylon/virgin Nylon 6,6 can also be mixed in the desired proportion with small pieces of Carbon or Glass Fibers as well as any other reinforcements, recycled (obtained from CFRP scrap through pyrolysis or solvolysis and cutting/grinding process to obtain powder) or not-recycled.

Quality Control Step

A quality control of the powder is performed after the grinding step. This quality control step comprises one or more of the following controls:

thermal analysis, such as Differential Scanning calorimetry (DSC), to detect changes in Glass Transition Temperature (Tg), melting temperature (Tm) or extent of crystallinity, and molecular weight analysis, such as Gel Permeation Chromatography (GPC).

The resulting powder is ready to be used in 3D SLS printers.

The mixing could be performed at the same time inside the same grinder 1 or each material could be cut up in a different grinder and then the provided powders would be mixed (50:50).

Additive manufacturing by means of FFF technology with recycled filaments 9 seems to be a good option for non-loaded applications with low rate production or where high NRC investments are required. Additive manufacturing technology appears as a better option versus other technologies (injection molding . . . ) for these applications.

Although the present invention has been fully described in connection with preferred embodiments, it is evident that modifications may be introduced within the scope thereof, not considering this as limited by these embodiments, but by the contents of the following claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for recycling plastic Nylon 6,6 from vacuum bags to obtain filaments for 3D printing processes, that comprises the following steps:

providing used Nylon 6,6 vacuum bags, checking, via a quality control step, a status of the used vacuum bags, forming smaller parts from the used vacuum bags via one of:

taking the vacuum bags into a grinder machine where they are cut up into smaller pieces, or cutting the vacuum bags into films, the films being rolled up and then being introduced into a set of extruder and cutter to obtain pellets, checking, via a quality control step, a status of the smaller pieces or the pellets, introducing the smaller pieces or the pellets into an extruder, where they are melted into a molten material, and the molten material is cooled and expelled through a die of the extruder to produce recycled filaments, winding the recycled filaments that have been expelled from the extruder into coils, and, adding virgin Nylon 6,6 in at least one of the step of forming smaller parts from the used vacuum bags or in the extruder which produces recycled filaments, wherein the quality control step to check the status of the used vacuum bags comprises one or more of the following controls:

visual inspection to detect any change of color, appearance, rigidity or flexibility that involves at least one of crystallinity degree modification or concentration of resin residues, and thermal analysis to detect weight loss percentage, and wherein the quality control step to check the status of the smaller pieces or pellets before the extrusion step comprises one or more of the following controls:

thermal analysis to detect changes in Glass Transition Temperature, melting temperature or extent of crystallinity, and molecular weight analysis.

2. The method for recycling plastic Nylon 6,6 from vacuum bags to obtain filaments for 3D printing processes, according to claim 1, further comprising a compounding step before the step of introducing into the extruder, in which the smaller pieces or the pellets and fiber reinforcements are introduced in a set of extruder and cutter for the compounding step to obtain reinforced smaller pieces or reinforced pellets to be used in the extrusion to filament step.

3. The method for recycling plastic Nylon 6,6 from vacuum bags to obtain filaments for 3D printing processes, according to claim 1, further comprising an adding of fiber reinforcements to the smaller pieces or the pellets to obtain reinforced filaments.

4. The method for recycling plastic Nylon 6,6 from vacuum bags to obtain filaments for 3D printing processes, according to claim 2, further comprising an adding of an anti-hydrolysis additive into the set of extruder and cutter to avoid humidity absorption in the step of forming smaller parts to obtain pellets.

5. The method for recycling plastic Nylon 6,6 from vacuum bags to obtain filaments for 3D printing processes, according to claim 2, wherein the fiber reinforcements are virgin fibers.

6. The method for recycling plastic Nylon 6,6 from vacuum bags to obtain filaments for 3D printing processes, according to claim 2, wherein the fiber reinforcements are recycled fibers obtained from fiber reinforced plastics scraps obtained during aircraft part production.

7. The method for recycling plastic Nylon 6,6 from vacuum bags to obtain filaments for 3D printing processes, according to claim 6, wherein the recycled fibers are obtained through a process of pyrolysis or solvolysis followed by a grinding or cutting process to obtain cut fiber.

8. The method for recycling plastic Nylon 6,6 from vacuum bags to obtain filaments for 3D printing processes, according to claim 1, wherein at least one of:

the quality control step to check the status of the used vacuum bags comprises Thermogravimetry thermal analysis, the quality control step to check the status of the smaller pieces comprises Differential Scanning calorimetry thermal analysis, or the quality control step to check the status of the smaller pieces comprises Gel Permeation Chromatography molecular weight analysis.

9. A method for recycling plastic Nylon 6,6 from vacuum bags to obtain filaments for 3D printing processes, that comprises the following steps:

providing used Nylon 6,6 vacuum bags, checking, via a quality control step, a status of the used vacuum bags, forming smaller parts from the used vacuum bags via one of:

taking the vacuum bags into a grinder machine where they are cut up into smaller pieces, or cutting the vacuum bags into films, the films being rolled up and then being introduced into a set of extruder and cutter to obtain pellets, checking, via a quality control step, a status of the smaller pieces or the pellets, introducing the smaller pieces or the pellets into an extruder, where they are melted into a molten material, and the molten material is cooled and expelled through a die of the extruder to produce recycled filaments, winding the recycled filaments that have been expelled from the extruder into coils, and, a compounding step before the step of introducing into the extruder, in which the smaller pieces or the pellets and fiber reinforcements are introduced in a set of extruder and cutter for the compounding step to obtain reinforced smaller pieces or reinforced pellets to be used in the extrusion to filament step, wherein the fiber reinforcements are recycled fibers obtained from fiber reinforced plastics scraps obtained during aircraft part production, wherein the quality control step to check the status of the used vacuum bags comprises one or more of the following controls:

visual inspection to detect any change of color, appearance, rigidity or flexibility that involves at least one of crystallinity degree modification or concentration of resin residues, and thermal analysis to detect weight loss percentage, and wherein the quality control step to check the status of the smaller pieces or pellets before the extrusion step comprises one or more of the following controls:

thermal analysis to detect changes in Glass Transition Temperature, melting temperature or extent of crystallinity, and molecular weight analysis.

10. The method for recycling plastic Nylon 6,6 from vacuum bags to obtain filaments for 3D printing processes, according to claim 9, wherein the recycled fibers are obtained through a process of pyrolysis or solvolysis followed by a grinding or cutting process to obtain cut fiber.

11. A method for recycling plastic Nylon 6,6 from vacuum bags to obtain filaments for 3D printing processes, that comprises the following steps:

providing used Nylon 6,6 vacuum bags, checking, via a quality control step, a status of the used vacuum bags, forming smaller parts from the used vacuum bags via one of:

taking the vacuum bags into a grinder machine where they are cut up into smaller pieces, or cutting the vacuum bags into films, the films being rolled up and then being introduced into a set of extruder and cutter to obtain pellets, checking, via a quality control step, a status of the smaller pieces or the pellets, introducing the smaller pieces or the pellets into an extruder, where they are melted into a molten material, and the molten material is cooled and expelled through a die of the extruder to produce recycled filaments, winding the recycled filaments that have been expelled from the extruder into coils, and, a compounding step before the step of introducing into the extruder, in which the smaller pieces or the pellets and fiber reinforcements are introduced in a set of extruder and cutter for the compounding step to obtain reinforced smaller pieces or reinforced pellets to be used in the extrusion to filament step, wherein the quality control step to check the status of the used vacuum bags comprises one or more of the following controls:

visual inspection to detect any change of color, appearance, rigidity or flexibility that involves at least one of crystallinity degree modification or concentration of resin residues, and thermal analysis to detect weight loss percentage, and wherein the quality control step to check the status of the smaller pieces or pellets before the extrusion step comprises one or more of the following controls:

thermal analysis to detect changes in Glass Transition Temperature, melting temperature or extent of crystallinity, and molecular weight analysis.

12. The method for recycling plastic Nylon 6,6 from vacuum bags to obtain filaments for 3D printing processes, according to claim 11, wherein at least one of the quality control step to check the status of the used vacuum bags comprises Thermogravimetry thermal analysis, the quality control step to check the status of the smaller pieces comprises Differential Scanning calorimetry thermal analysis, or the quality control step to check the status of the smaller pieces comprises Gel Permeation Chromatography molecular weight analysis.

* * * * *